United States Patent
Pulito et al.

(10) Patent No.: US 9,112,831 B2
(45) Date of Patent: Aug. 18, 2015

(54) SCALABLE INFRASTRUCTURE FOR HANDLING LIGHT WEIGHT MESSAGE PROTOCOLS

(75) Inventors: Brian Pulito, Lexington, KY (US); Malissa Sullivan, Versailles, KY (US); Yafit Sami, Rishon le Zivon (IL); Oded Hirschfeld, Nes-Tziona (IL); Mark Wallace, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 2554 days.

(21) Appl. No.: 11/191,333

(22) Filed: Jul. 28, 2005

(65) Prior Publication Data

US 2006/0026290 A1  Feb. 2, 2006

Related U.S. Application Data

(60) Provisional application No. 60/591,729, filed on Jul. 28, 2004.

(51) Int. Cl.
  *G06F 15/16* (2006.01)
  *H04L 29/08* (2006.01)

(52) U.S. Cl.
  CPC ............. *H04L 67/04* (2013.01); *H04L 67/02* (2013.01); *H04L 2212/0025* (2013.01)

(58) Field of Classification Search
  CPC .. H04L 2212/0025; H04L 67/02; H04L 67/04
  USPC ........................................................ 709/230
  See application file for complete search history.

(56) References Cited

U.S. PATENT DOCUMENTS

| | | | |
|---|---|---|---|
| 6,014,689 A | 1/2000 | Budge et al. | |
| 6,412,009 B1 * | 6/2002 | Erickson et al. | 709/228 |
| 7,305,546 B1 * | 12/2007 | Miller | 713/153 |
| 7,418,509 B2 | 8/2008 | Koskelainen et al. | |
| 2001/0052024 A1 | 12/2001 | Devarakonda et al. | |
| 2002/0026474 A1 | 2/2002 | Wang et al. | |
| 2002/0083345 A1 * | 6/2002 | Halliday et al. | 713/201 |
| 2002/0103850 A1 | 8/2002 | Moyer et al. | |
| 2002/0120729 A1 | 8/2002 | Faccin et al. | |
| 2002/0174010 A1 | 11/2002 | Rice | |
| 2002/0184376 A1 | 12/2002 | Sternagle | |
| 2003/0046348 A1 | 3/2003 | Pinto et al. | |

(Continued)

OTHER PUBLICATIONS

Fielding, et al., "Hypertext Transfer Protocol—HTTP/1.1", RFC 2616, http://www.ietf.org/rfc/rfc2616.txt, Jun. 1999, Sections 1-21.*

(Continued)

*Primary Examiner* — Suraj Joshi

(74) *Attorney, Agent, or Firm* — Schmeiser, Olsen & Watts LLP

(57) ABSTRACT

A system and method is provided that includes a communication protocol for handling Hypertext Transfer Protocol (HTTP) messages is provided. The communication protocol may include a first protocol (e.g., HTTP channel tunneling) for providing a persistent connection based on the utilization of one or more HTTP methods (e.g., GET, POST, etc.). A second protocol (e.g., Blocks Extensible Exchange Protocol) may be provided for multiplexing a plurality of application protocols for communication over a single connection using the first protocol. The plurality of application protocols that are received from the first protocol may be demultiplexed for processing.

15 Claims, 4 Drawing Sheets

(56) References Cited

U.S. PATENT DOCUMENTS

| | | |
|---|---|---|
| 2003/0149774 A1 | 8/2003 | McConnell et al. |
| 2003/0206192 A1* | 11/2003 | Chen et al. .................... 345/733 |
| 2004/0044778 A1* | 3/2004 | Alkhatib et al. .............. 709/228 |
| 2004/0107238 A1 | 6/2004 | Orton et al. |
| 2004/0260819 A1 | 12/2004 | Trossen |
| 2005/0102377 A1 | 5/2005 | King et al. |
| 2005/0111382 A1 | 5/2005 | Le et al. |
| 2005/0119012 A1 | 6/2005 | Merheb et al. |
| 2005/0131902 A1 | 6/2005 | Saika |
| 2005/0198321 A1 | 9/2005 | Blohm |
| 2006/0085545 A1 | 4/2006 | Borella et al. |

OTHER PUBLICATIONS

Final Office Action in related U.S. Appl. No. 11/191,334, mailed on Jun. 9, 2011; 21 pages.

Non-Final Office Action in related U.S. Appl. No. 11/191,334, mailed on Dec. 22, 2010; 18 pages.

Final Office Action in related U.S. Appl. No. 11/191,334, mailed on Nov. 23, 2009; 12 pages.

Non-Final Office Action in related U.S. Appl. No. 11/191,334, mailed on Apr. 2, 2009; 16 pages.

Final Office Action in related U.S. Appl. No. 11/191,332, mailed on Nov. 19, 2008; 12 pages.

Non-Final Office Action in related U.S. Appl. No. 11/191,332, mailed on Jul. 31, 2008; 12 pages.

Final Office Action in related U.S. Appl. No. 11/191,332, mailed on Feb. 19, 2008; 11 pages.

Non-Final Office Action in related U.S. Appl. No. 11/191,332, mailed on Sep. 12, 2007; 11 pages.

* cited by examiner

SCALABLE INFRASTRUCTURE FOR HANDLING LIGHT WEIGHT MESSAGE PROTOCOLS

CROSS-REFERENCE TO RELATED APPLICATIONS

The present application claims the benefit under 35 U.S.C. §119(e) from U.S. Provisional Patent Application Ser. No. 60/591,729, filed Jul. 28, 2004, the contents of which is incorporated by reference in its entirety.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The present invention relates generally to a system and method for handling various different protocols over a client/server connection. More particularly, the present invention provides a web-based communication protocol that provides a persistent connection from the client to the server in such a way that the client may receive instantaneous, asynchronous updates from the server.

Certain application programs such as Instant Messaging may take advantage of Internet technology that allows users to send text messages that are delivered in real time. Such programs may use application layer protocols such a Hypertext Transfer Protocol (HTTP) to provide enhanced access to communication channels on the Internet. With the accelerated growth of both the Internet and software that interacts and communicate via the Internet, various protocols and standards have been developed for increasing the reliability, bandwidth, and speed of information access by such application programs. In order to achieve these goals, various application layer and/or transport layer protocols may be introduced that provide overall performance increase in Internet communications.

SUMMARY OF THE INVENTION

In accordance with an embodiment of the present invention, a communication protocol for handling Hypertext Transfer Protocol (HTTP) messages is provided. The communication protocol may include a first protocol (e.g., channel tunneling) for providing a persistent connection based on the utilization of one or more HTTP methods (e.g., GET, POST, etc.). A second protocol provided to multiplex a plurality of application protocols allows communication over a single connection that may be provided by the first protocol. The plurality of multiplexed application protocols that are received from the first protocol may be demultiplexed and processed at a communication node such as a server.

In accordance with an embodiment of the present invention, a communication system including a client browser is provided, wherein the communication system may be in communication with a network. The client browser may include a plurality of application programs having certain application protocols. A first protocol may be provided for receiving and multiplexing the plurality of application protocols. A second protocol may be provided for receiving and sending the multiplexed plurality of application protocols over a persistent HTTP/TCP connection to a server via the network. The first protocol may also demultiplex a plurality of application protocols that are received over the network from the persistent connection that may be created and maintained by the second protocol.

In accordance with an embodiment of the present invention, a method of handling requests in a communication infrastructure is provided. The method may include receiving and multiplexing a plurality of application protocols. A persistent HTTP connection may then be generated, where the multiplexed application protocols may be sent over the generated persistent HTTP connection for the purpose of transmitting data associated with the application protocols over a single connection.

In accordance with an embodiment of the present invention, a method of providing Internet based message protocol communication within a communication infrastructure is provided. The method may include providing a tunneling connection to a host and encapsulating within a HTTP message a plurality of multiplexed application protocols. The multiplexed application protocols may then be sent to the host via the tunneling connection. The plurality of multiplexed application protocols may also be demultiplexed from the encapsulated HTTP message at the host.

BRIEF DISCRIPTION OF DRAWINGS

The invention is illustrated in the figures of the accompanying drawings, which are meant to be exemplary and not limiting, and in which like references are intended to refer to like or corresponding parts, and in which.

DETAILED DESCRIPTION

Figure 1:
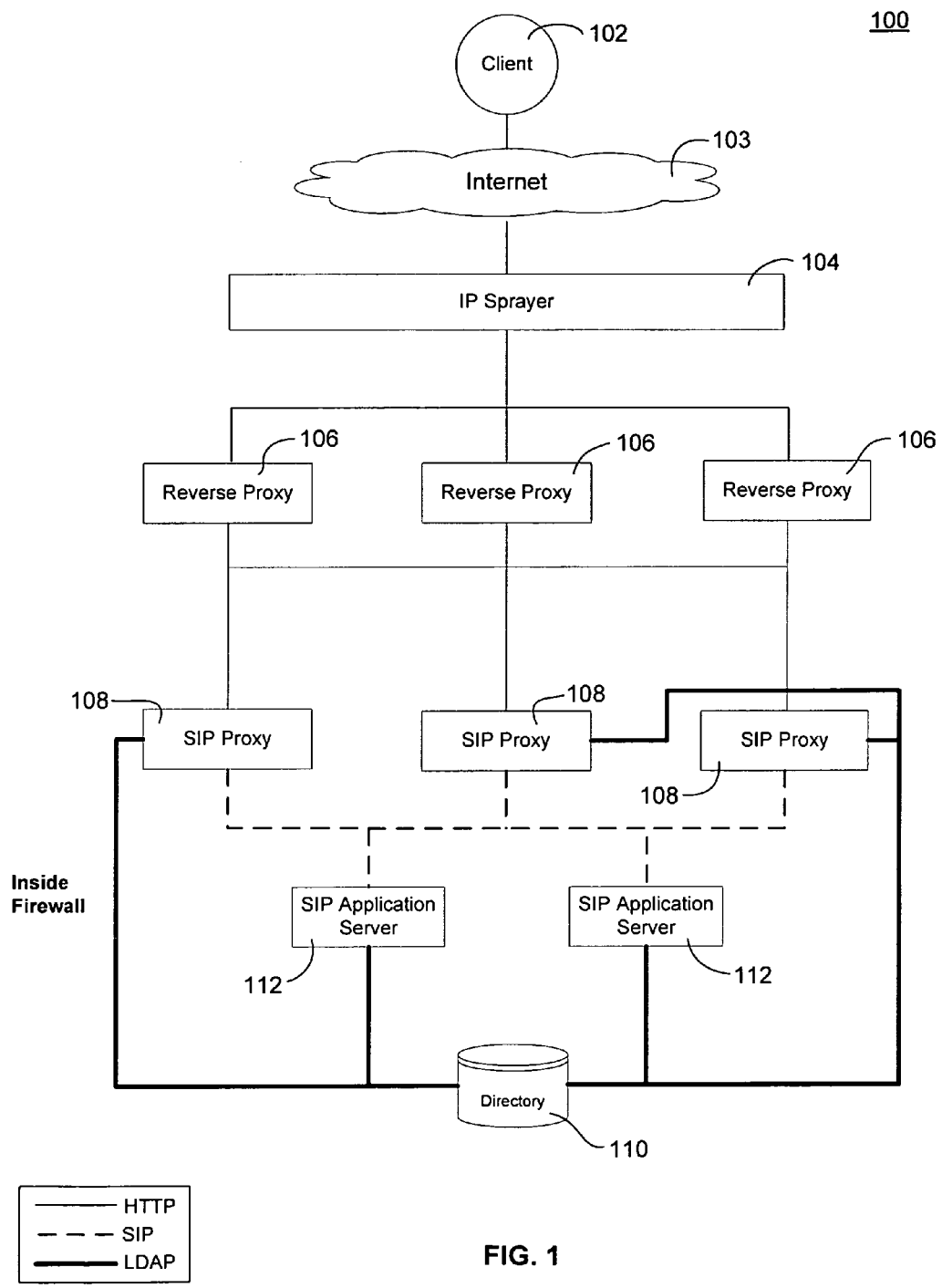
FIG. 1 is a block diagram of a system for handling message protocols constructed in accordance with an embodiment of the present invention.

FIG. 1 illustrates an example of a network topology 100 for utilizing a communication protocol in accordance with an embodiment of the present invention. Network topology 100 may include one or more clients 102, an IP sprayer 104, a cluster of reverse proxy servers 106, a cluster of Session Initiation Protocol (SIP) proxy servers 108, a data storage or directory system 110, and a cluster of SIP application servers 112.

The one or more clients 102 may include a client browser program (e.g., Internet Explorer®) for accessing a communication network such as the Internet. Clients 102 may include browsers running on computer or processing devices that are connected to a fixed address location within the communication network. Alternatively, clients 102 may include browsers running on mobile computer or processing devices such as Personal Digital Assistant (PDA) devices.

Sprayer 104 may use different functional modes to distribute data. For example, using one functional mode, the IP sprayer 104 may substantially evenly distribute data to network devices that are connected to its output ports. In another functional mode, the sprayer 104 may randomly assign received data to one of its output ports.

Reverse proxys 106 may maintain routing affinity by routing data associated with a particular client session to the same server device that handled subsequent requests associated with that client session. Proxys 106 may include any other server devices capable of routing HTTP requests to either another cluster of proxy servers or application servers. Proxys 106 may be arranged in a cluster, where the cluster architecture may be referred to as a group of servers that are in communication with each other. This communication within the cluster provides certain functionality such as redundancy in the event of one or more proxys failing.

The cluster of SIP proxys 108 may be responsible for maintaining a client's connection session. In addition, proxys 108 may authenticate the client using authentication information such as user name and password information. Each of the SIP proxy servers 108 may include certain routing/communication capabilities, including a TCP/SSL, HTTP, HTTP tunneling, application protocol multiplexing/demultiplexing, and various message handlers (e.g., Meeting, People Links, Mobile, etc.) for maintaining and managing a client's session. The cluster architecture, as previously described, may be referred to as a group of servers (e.g., SIP proxys) that are in communication with each other. This communication within the cluster provides functionality such as redundancy in the event of one or more proxys failing.

Data storage or directory system 110 may include a database for storing authentication information (e.g., password information) associated with users of a communication network. The cluster of SIP application servers 112 may process HTTP requests that are received from one or more other cluster or servers. The application servers 112 may provide session affinity by maintaining communication with the same server or proxy device that has handled subsequent HTTP requests associated with a client's session. The cluster of SIP application servers 112 may also authenticate the client using authentication information such as user name and password information.

In operation, client 102 may communicate with IP sprayer 104 over a network such as Internet 103. The sprayer 104 may use different functional modes to distribute data that is received from a client 102. For example, in one functional mode, the IP sprayer 104 may employ a load-balancing algorithm for evenly distributing the received data load across the cluster of reverse proxy servers 106 that connected to the output ports of the sprayer 104.

The cluster of reverse proxy servers 106 may route client data that is received from the IP sprayer 104 in a manner that maintains routing affinity between the client 102 and the cluster of Session Initiation Protocol (SIP) proxy servers 108. Routing affinity may include the routing of data (e.g., HTTP requests) associated with a client session to the same SIP proxy within the cluster of SIP proxys 108 that handled subsequent data or messages associated with the client's connection session. Thus, data previously sent to one of the SIP proxys 108 in a communication session between the client and SIP proxy, may be routed to the same SIP proxy by the reverse proxy servers 106. By maintaining the same client and server communication (i.e., affinity), the communication overhead between the client and server is decreased. For example, additional routing processing may not be necessary because the same connection to the same resource (i.e., server) is used.

SIP proxys 108 may maintain the connection session between the reverse proxys 106 and SIP application servers 112. For example, proxys 108 may maintain routing affinity 112 by routing data associated with a client to the same SIP application server based on any subsequent HTTP requests that was handled by that same SIP application server for that client. In addition, proxys 108 may authenticate the client using a software protocol such as a Light Weight Directory Access Protocol (LDAP). Using LDAP, the proxys 108 may access authentication information (e.g., username, password, etc.) from the data storage or directory system 110.

The cluster of SIP proxy servers 108 may process tunneled HTTP requests that are received from client 102 via one of the servers in the cluster of reverse proxys 106. HTTP tunnel session affinity may be maintained between the client 102 and SIP proxy servers 108 through the reverse proxys 106. In addition to processing SIP messages that may be received from SIP proxy servers 108, the cluster of SIP application servers 112 may also authenticate clients using the LDAP Protocol to access user or client authentication information from data storage 110.

Using the topology of FIG. 1, client 102 may establish a persistent connection to one of the servers in the cluster of SIP proxy servers 108. The persistent connection may provide a suitable data transmission path for asynchronous real-time data that may be exchanged between users running application programs such as, eMeeting®. eMeeting for example, is a real-time collaboration software that facilitates web meetings, voice-over-IP, web conferencing etc. Data exchange for such application programs may be accomplished by HTTP channel tunneling, which is further discussed below and generally speaking facilitates allowing the client to penetrate a Firewall at the network location of a host server (e.g., application servers). Moreover, by multiplexing application protocols into a single physical persistent connection, a browser may open an increased number of HTTP requests at any one time. This is advantageous because, traditionally, browsers can handle a limited number of requests at any given time. According to the embodiments of the present invention described herein, the persistent connectivity channel and multiplexing capabilities of the communication protocol provide an enhanced communications infrastructure.

The server components 106, 108, 112 illustrated in FIG. 1 may be any type of remote computer, network, database, or repository capable of receiving and processing data or information. Moreover, the cluster of server components 106, 108, 112 may include various communication means for providing the interconnection between each of the servers within each cluster. The communication means may include waveguide (e.g., coax, fiber optic cable, ribbon cable etc.) and/or wireless capabilities (e.g., infra-red, rf radio, microwave radio, etc.) for providing communication between the servers within each cluster. The waveguide (e.g., coax, fiber optic cable, ribbon cable etc.) and/or wireless (e.g., infra-red, rf radio, microwave radio, etc.) communication means may also be incorporated for communication between the server clusters, IP sprayer and clients within the system architecture illustrated in FIG. 1.

Figure 2:
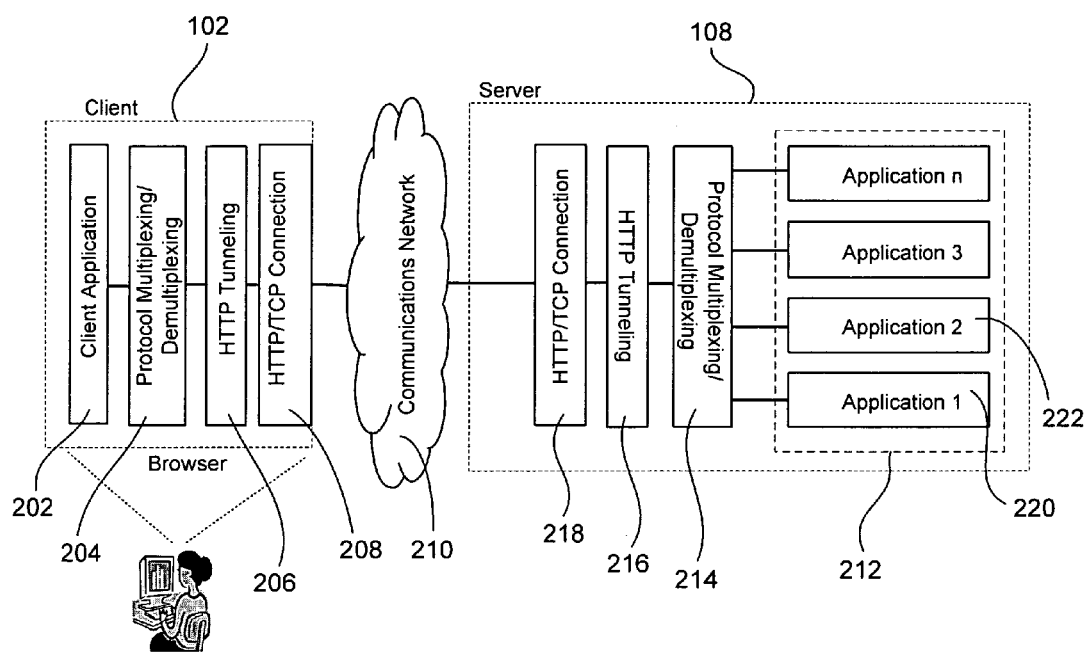
FIG. 2 is a block diagram illustrating the protocol layers utilized in components of the communication infrastructure for handling message protocols according to the embodiment of FIG. 1.

FIG. 2 is a block diagram 200 illustrating some of the protocol layers utilized in the communication infrastructure for handling message protocols in accordance with an embodiment of the present invention. Client 102, which is also illustrated and described in relation to FIG. 1, is explained in more detail. Client 102 may include protocol layers such as application protocol layer 202, protocol multiplexing and demultiplexing layer 204, HTTP tunneling layer 206, and HTTP/TCP layer 208. Similarly, server device 108, which is also illustrated and described in relation to FIG. 1, is explained in more detail. Server device 108 may also include protocol layers such as application protocol layer 212, protocol multiplexing and demultiplexing layer 214, HTTP tunneling layer 216, and HTTP/TCP layer 218.

Client application protocols running at layer 202 may be received by protocol multiplexing and demultiplexing layer 204, where at least two application protocols may be multiplexed for transmission over a single socket. An example of such a protocol may include a Blocks Extensible Exchange protocol (BEEP) may be an example of such a protocol multiplexing and demultiplexing layer. Next, at tunneling layer 206, a single persistent connection may be created for sending the multiplexed application protocols via communications network 210 to server device 108. The single persistent or continuous connection may be associated with either a physical connection or a virtual connection. Moreover, a persistent connection may be a connection between two entities such as a client and a server. This communication may be maintained continuously for a period needed for data transmission between the application protocols running on the client and the server.

Server device 108 may be a proxy server, such as SIP proxy server 108, as indicated in FIG. 1. The multiplexed application protocols may be encapsulated as HTTP messages and transmitted over network 210 by HTTP/TCP connection layer 208.

At server 108 the HTTP message including the multiplexed application protocols may be received by HTTP/TCP layer 218. At HTTP/TCP layer 218, the HTTP message including the multiplexed application protocols may be processed to facilitate reliable data transfer of the encapsulated application protocols sent from client 102. HTTP tunneling layer 216 may maintain the persistent connection between client 102 and server 108 during such data transfer activities for the purpose of maintaining a constant connection between the client and server. By maintaining this connection, the latency time for re-establishing another connection is avoided. Moreover, the processing and communication overhead associated with the client, server, and any intermediate nodes between the client/server is decreased.

The multiplexed application protocols transmitted from client 108 may be demultiplexed via protocol multiplexing and demultiplexing layer 214 of server 108. Once demultiplexed, each transmitted application protocol from client 108 may be processed by application protocol layer 212. For example, two application protocols associated with software programs eMeeting and Instant Messaging are multiplexed and sent from client 102 to server 108. At layer 212 of server 108, the sent application protocols may be demultiplexed and processed by application protocols 220 and 222, which are the designated application protocols associated with the eMeeting and Instant Messaging software.

Figure 3:
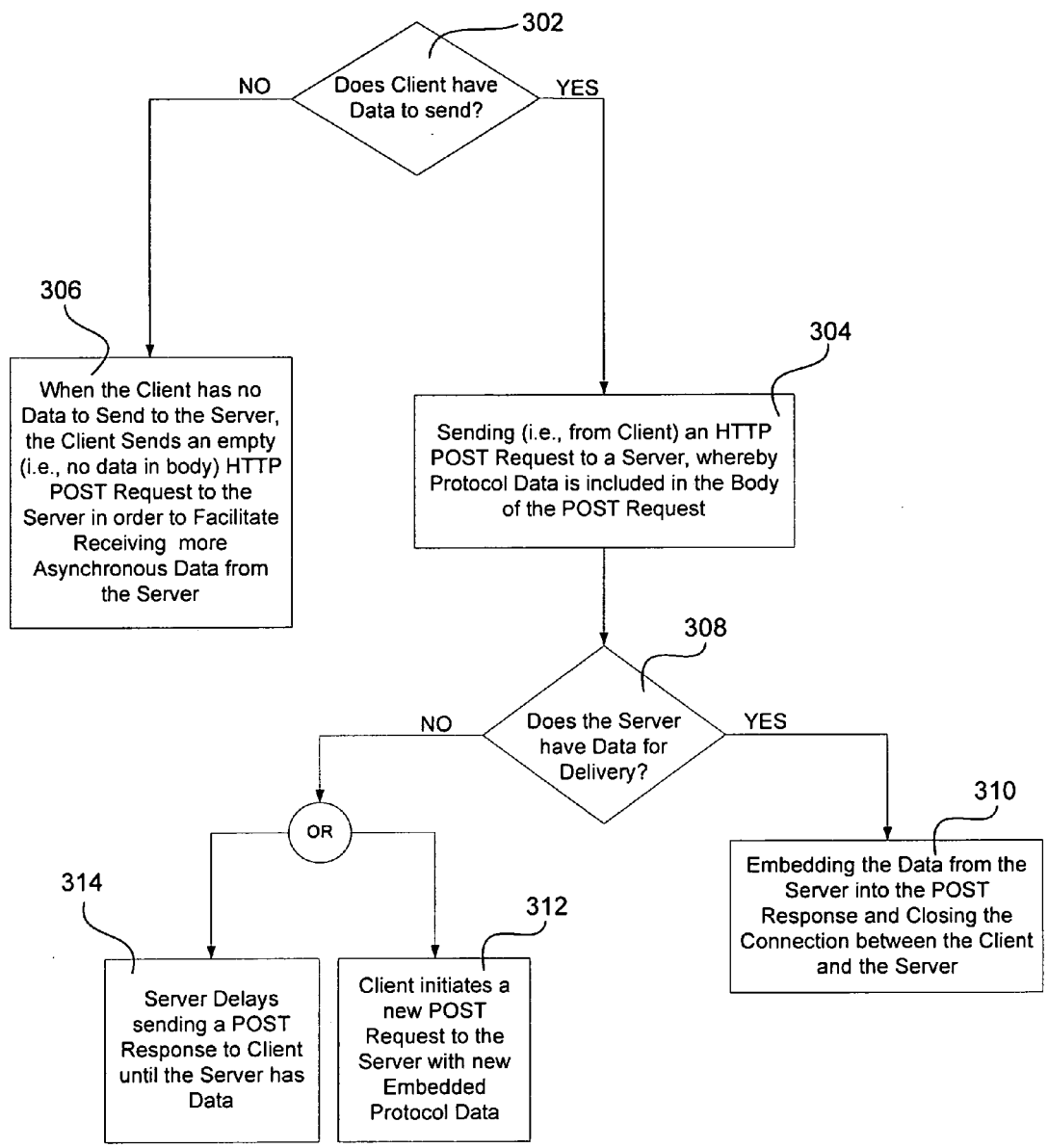
FIG. 3 is a flowchart illustrating some of steps involved in the HTTP channel tunneling process according to an embodiment of the present invention.

FIG. 3 is a flowchart 300 illustrating some of the steps of the HTTP channel tunneling process according to an embodiment of the present invention. At step 302, it may be determined whether the client has data to send to the server. If the client has data to send, the client may send an HTTP POST request to the server, where the body of the HTTP request may include application protocol data (step 304).

If it is determined that the client has no data to send to the server (step 302) and has received a response message (e.g., POST response) from the server, the client may then send an empty HTTP POST request (i.e., no data in body of request) to the server (step 306) for maintaining a continuous connection between the client and server (step 306).

Once an HTTP request is sent from the client to the server for processing (step 304), it may be determined whether the server has response data for transmission to the client, as indicated at step 308. If it is determined that the server has response data for the client (step 308), the server may embed or otherwise associate this data into a HTTP POST response message for transmission to the client (step 310). In this manner, the response data may be tunneled between the client and server. Once the HTTP POST response message is sent to the client by the server, the server may close the client/server connection (step 310).

If at step 308, it is determined that the server has no data to send to the client, then the client may initiate a new POST request to the server, where the new POST request also includes embedded application protocol data (step 312). Alternatively, if the server has no data to send to the client (step 308), then the server may delay sending an HTTP POST response to the client until the server has data for encapsulation with the POST response message (step 314). This maintains the established connection or communication channel between the client and server so that when data becomes available, it may be transmitted to the client without the need to re-establishing a new connection. In accordance with an embodiment of the present invention, the abovementioned use of HTTP messaging (e.g., GET, POST, etc.) may be used to establish a persistent client/server connection over a communications network such as the Internet. In alternative embodiments, HTTP GETS messages in addition to HTTP POST messages may be used to tunnel data between a client and server on a network. In such an embodiment, HTTP GETS may be used to retrieve tunneled data from the server and HTTP POST may be used to send tunneled data to the server.

Figure 4:
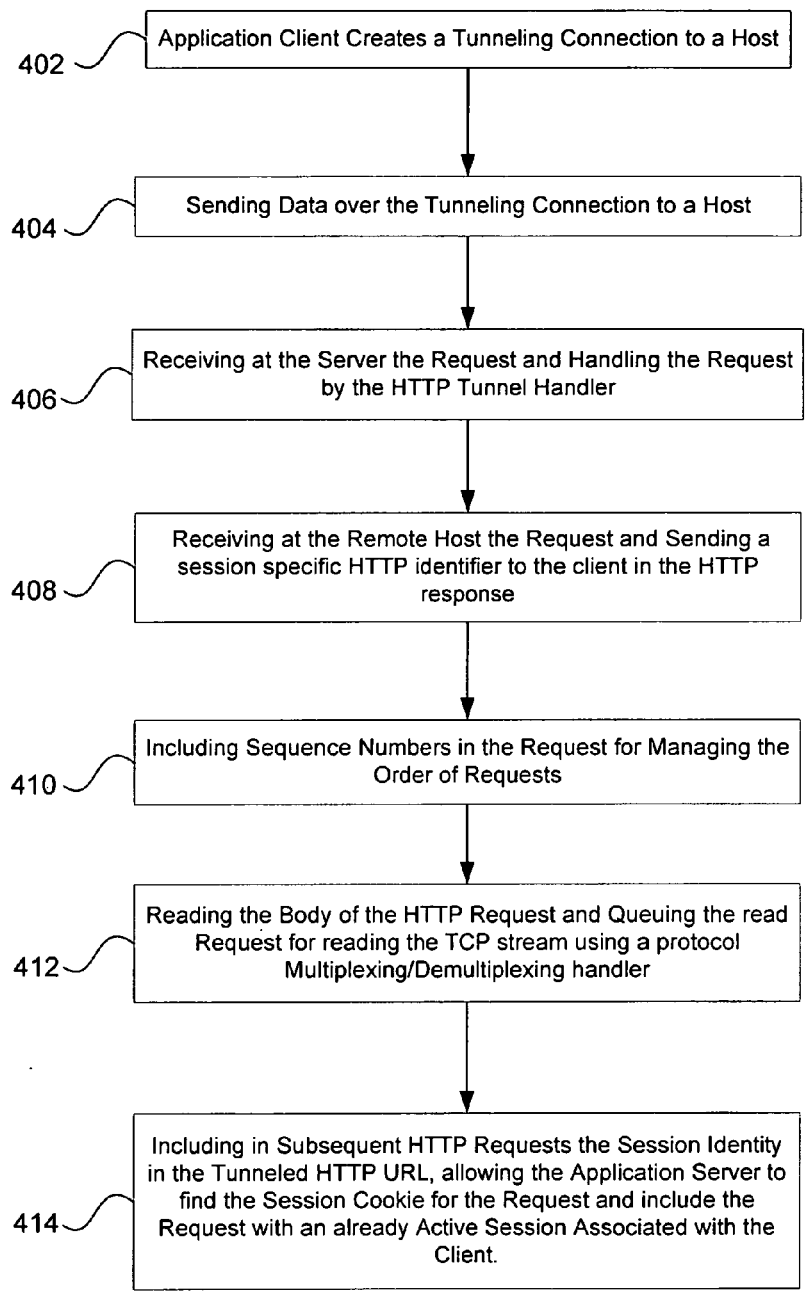
FIG. 4 is a flowchart illustrating some of the steps involved in the operational process for generating a client/server HTTP connection using a layered protocol according to an embodiment of the present invention.

FIG. 4 is a flowchart 400 illustrating the operational process for generating a client/server HTTP connection using a layered protocol according to an embodiment of the present invention. At step 402, the client may initiate an HTTP tunneling connection to a host server. Once the tunneling connection is created (step 402), data may be sent from the client over the tunneling connection to the host server (step 404). This data may include several application protocols multiplexed (e.g., BEEP protocol) into a single TCP data stream for transmission over a persistent HTTP connection established by the HTTP tunneling. At step 406, the host server may receive and process the HTTP request using an HTTP tunnel handler, which may include software programming or code for handling data over the HTTP and TCP channels.

At step 408, the remote host server receives the HTTP request and may return a session specific HTTP identifier to the client in an HTTP response. This HTTP session identifier may include an HTTP cookie (e.g., Single Sign-On tokens) or in the case of mobile clients, the session identifier may include the use of the Universal Resource Identifier (URI) as a means for identifying and maintaining a client/server session (e.g., session affinity). This may establish an increased performance in data processing, because session affinity maintains a channel between the client and the same host server that handled subsequent client requests. This way the additional processing needed for determining which host server to send the client's request and/or response to may be reduced.

At step 410, the client may include a sequence number in the URI query parameter so that the host server may detect and process HTTP request messages that are received out of order. At step 412, the host server may read and queue the body of the HTTP request for processing by a protocol multiplexing/demultiplexing handler (e.g., BEEP protocol). The read TCP data stream within the HTTP request may be demultiplexed for processing by a designated application program at the host server.

At step 414, subsequent HTTP requests may include session identifiers (e.g., a cookie) in the tunneled HTTP URL. This may allow the host server (e.g., application server) to find the identifier (e.g., session cookie) for the request and process the request as part of an existing active session associated with the client, thus, increasing the overall efficiency of data communication between the client and host server.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In some cases the order of process steps may be varied without changing the purpose, effect or import of the methods described.

What is claimed is:

1. A method of handling requests in a communication infrastructure, the method comprising:
   receiving a plurality of application protocols;
   multiplexing the received plurality of application protocols;
   generating a persistent HTTP connection providing for repeated engagements to and from the plurality of application protocols, the persistent HTTP connection maintaining its persistent connection during communication inactivity absent a communication response from a server to the plurality of application protocols, the communication response delayed to maintain the persistent HTTP connection; and
   sending asynchronous data associated with the multiplexed plurality of application protocols over the generated persistent HTTP connection, wherein additional asynchronous data is capable of being transmitted to the server on the persistent HTTP connection maintained during the delayed communication response from the server.

2. The method according to claim 1, further comprising de-multiplexing an other multiplexed plurality of application protocols received from the generated persistent connection.

3. The method according to claim 1, wherein the persistent HTTP connection creates a tunneling connection to a host.

4. A method of providing Internet based message protocol communication within a communication infrastructure, the method comprising:
   providing a tunneling connection to a host that provides a persistent HTTP connection providing for repeated Internet based message protocol communications, the persistent HTTP connection maintaining its persistent connection during communication inactivity absent a communication response from a server to the plurality of application protocols, the communication response delayed to maintain the persistent HTTP connection;
   encapsulating within a HTTP message a plurality of multiplexed application protocols;
   sending asynchronous data associated with the plurality of multiplexed application protocols to the host via the tunneling connection, wherein additional asynchronous data is capable of being sent to the server on the persistent HTTP connection maintained during the delayed communication response from the server; and
   demultiplexing the plurality of multiplexed application protocols from the encapsulated HTTP message at the host.

5. The method according to claim 4, wherein the HTTP message comprises a HTTP request.

6. The method according to claim 5, wherein the host receives the HTTP request and a session identifier is returned to a client in a HTTP response.

7. The method according to claim 6, wherein the session identifier comprises a session specific HTTP cookie.

8. The method according to claim 5, wherein the HTTP request comprises a sequence number for determining the order of the HTTP request at the server.

9. The method according to claim 4, wherein a Block Extensible Exchange Protocol (BEEP) generates the plurality of multiplexed application protocols from at least two application protocols.

10. The method according to claim 4, wherein providing the tunneling connection comprises:
    sending from a client a first HTTP request to the server, wherein the first HTTP request comprises multiplexed protocol data embedded in the first HTTP request;
    sending from the server an HTTP response comprising data based on processing of the multiplexed protocol data received from the first HTTP request; and
    sending from the client a second HTTP request to the server based on receiving the HTTP response from the server.

11. The method according to claim 10, wherein the processing of the multiplexed protocol data comprises determining whether the server has data for sending to the client based on the received first HTTP request.

12. The method according to claim 11, wherein the data is sent to the client when it is determined that the server has the data to send to the client.

13. The method according to claim 11, wherein the server refrains from sending the HTTP response to the client until the server has the data.

14. The method according to claim 10, wherein the first HTTP request comprises an HTTP POST request including embedded data and the second HTTP request comprises an empty HTTP POST request.

15. The method according to claim 10, wherein the HTTP response comprises an HTTP POST response.

* * * * *